United States Patent
Schmitz

(10) Patent No.: US 7,343,519 B2
(45) Date of Patent: Mar. 11, 2008

(54) DISK DRIVE POWER CYCLE SCREENING METHOD AND APPARATUS FOR DATA STORAGE SYSTEM

(75) Inventor: Thomas A. Schmitz, Bel Aire, KS (US)

(73) Assignee: LSI Logic Corporation, Milpitas, CA (US)

( * ) Notice: Subject to any disclaimer, the term of this patent is extended or adjusted under 35 U.S.C. 154(b) by 550 days.

(21) Appl. No.: 10/838,081

(22) Filed: May 3, 2004

(65) Prior Publication Data

US 2005/0257081 A1 Nov. 17, 2005

(51) Int. Cl.
*G06F 11/00* (2006.01)
(52) U.S. Cl. .......................... 714/23; 713/330
(58) Field of Classification Search ............... None
See application file for complete search history.

(56) References Cited

U.S. PATENT DOCUMENTS

| | | | | |
|---|---|---|---|---|
| 6,154,853 A * | 11/2000 | Kedem | ......................... | 714/6 |
| 6,854,071 B2 * | 2/2005 | King et al. | ..................... | 714/8 |
| 6,959,399 B2 * | 10/2005 | King et al. | ..................... | 714/6 |
| 6,996,635 B2 * | 2/2006 | Goodman et al. | ............. | 710/5 |
| 7,013,336 B1 * | 3/2006 | King | ......................... | 709/224 |
| 7,032,218 B2 * | 4/2006 | Shirasawa et al. | .......... | 717/168 |
| 7,143,308 B2 * | 11/2006 | Tseng et al. | .................. | 714/6 |
| 2002/0169996 A1 * | 11/2002 | King et al. | ..................... | 714/8 |

* cited by examiner

*Primary Examiner*—Christopher McCarthy
(74) *Attorney, Agent, or Firm*—Suiter Swantz PC LLO

(57) ABSTRACT

The present invention is a disk drive power cycle screening method and apparatus for a data storage system. In an exemplary aspect of the present invention, a disk drive power cycle screening method for a data storage system includes: (a) selecting one or more drives in a disk array for power cycle screening; (b) transferring data contained in the selected one or more drives to at least one receiving drive in the disk array; (c) cycling power for the selected one or more drives; (d) verifying that the selected one or more drives function properly; and (e) returning the data from the at least one receiving drive to the selected one or more drives.

18 Claims, 4 Drawing Sheets

DISK DRIVE POWER CYCLE SCREENING METHOD AND APPARATUS FOR DATA STORAGE SYSTEM

FIELD OF THE INVENTION

This invention relates generally to data storage systems, and particularly to a disk drive power cycle screening method and apparatus for a data storage system such as a RAID storage system, or the like.

BACKGROUND OF THE INVENTION

RAID (redundant array of independent disks) is a category of disk drives that employ two or more drives in combination for fault tolerance and performance. The goal of a RAID is to provide more reliable disk storage and/or larger virtual disk capacity than is possible with a single hard disk. RAID arrays are usually implemented with identically-sized disk drives. A disk system with RAID capability can protect its data and provide online, immediate access to its data, despite a single disk failure (some RAID storage systems can withstand two concurrent disk failures). RAID disk drives are used frequently on servers but are not generally necessary for personal computers. There are 7 official levels: RAID Level 0 (RAID 0) to RAID Level 6 (RAID 6). There can also be combinations of RAID levels. The most common combinations are RAID 10 and RAID 0+1. JBOD (Just a Bunch of Disks) is a related array type.

RAID Level 0 (RAID 0) is not redundant, hence does not truly fit the "RAID" acronym. In level 0, data is split across drives, resulting in higher data throughput. Since no redundant information is stored, performance is very good, but the failure of any disk in the array results in data loss. This level is commonly referred to as striping.

RAID Level 1 (RAID 1) provides redundancy by writing all data to two or more drives. The performance of a level 1 array tends to be faster on reads and slower on writes compared to a single drive. However, if either drive fails, no data is lost. This is a good entry-level redundant system, since only two drives are required. On the other hand, since one drive is used to store a duplicate of the data, the cost per megabyte is high. This level is commonly referred to as mirroring.

RAID Level 2 (RAID 2), which uses Hamming error correction codes, is intended for use with drives which do not have built-in error detection. All SCSI drives support built-in error detection, so this level is of little use when using SCSI drives.

RAID Level 3 (RAID 3) stripes data at a byte level across several drives, with parity stored on one drive. It is otherwise similar to level 4. Byte-level striping requires hardware support for efficient use.

RAID Level 4 (RAID 4) stripes data at a block level across several drives, with parity stored on one drive. The parity information allows recovery from the failure of any single drive. The performance of a level 4 array is very good for reads (the same as level 0). Writes, however, require that parity data be updated each time. This slows small random writes in particular, even though large writes or sequential writes are fairly fast. Because only one drive in the array stores redundant data, the cost per megabyte of a level 4 array can be fairly low.

RAID Level 5 (RAID 5) is similar to level 4, but distributes parity among the drives. This can speed small writes in multiprocessing systems, since the parity disk does not become a bottleneck. However, because parity data must be skipped on each drive during reads, the performance for reads tends to be considerably lower than a level 4 array. The cost per megabyte is the same as for level 4.

RAID Level 6 (RAID 6) requires a minimum of three drives, but four are required to exceed RAID 1 space efficiency. Entire data block is written to data disk; parity is generated and written to two distributed parity strips, on two separate drives.

RAID 10 is sometimes called RAID 1+0. Multiple RAID 1 mirrors are created, and a RAID 0 stripe is created over these mirrors. This category does not fit with one of the original 6 levels, but is a combination of RAID 1 and 0. RAID 10 can potentially handle multiple simultaneous disk failures, as long as at least one disk of each mirrored pair is operable.

RAID 0+1 is also not one of the original 6 RAID levels. Two RAID 0 stripes are created, and a RAID 1 mirror is created over these two RAID 0 stripes. RAID 0+1 is not as robust as RAID 1+0. RAID 0+1 cannot tolerate two simultaneous disk failures, if the failure is not from the same stripe.

JBOD is an acronym for Just a Bunch of Disks. JBOD is not a type of RAID as there is no redundancy. Rather, JBOD simply takes multiple drives and stitches them together as if they were a larger drive.

RAID is designed to improve system reliability by adding redundancy and protecting against disk failures. However, RAID is not designed against power failures, which may lead to damaged data that is not recoverable. Conventionally, in order to ensure that a data storage system may survive a power failure, the data storage system power is cycled (i.e., powered down and powered up) occasionally. However, a data storage system such as a RAID storage system, and the like, often uses many drives for storing data. The conventional method may not be able to verify that each drive in the data storage system survives a power failure. Furthermore, the conventional method may lack automatic and online capability.

Thus, it would be desirable to provide a disk drive power cycle screening method and apparatus for a data storage system, which may automatically verify, even when the data storage system is in normal operation, that a drive in the data storage system survives a power failure.

SUMMARY OF THE INVENTION

In a first aspect of the present invention, a disk drive power cycle screening method for a data storage system includes: (a) selecting one or more drives in a disk array for power cycle screening; (b) transferring data contained in the selected one or more drives to at least one receiving drive in the disk array; (c) cycling power for the selected one or more drives; (d) verifying that the selected one or more drives function properly; and (e) returning the data from the at least one receiving drive to the selected one or more drives.

In an additional aspect of the present invention, an apparatus for implementing a disk drive power cycle screening method for a data storage system includes: (1) means for selecting one or more drives in a disk array for power cycle screening; (2) means for transferring data contained in the selected one or more drives to at least one receiving drive in the disk array; (3) means for cycling power for the selected one or more drives; (4) means for verifying that the selected one or more drives function properly; and (5) means for returning the data from the at least one receiving drive to the selected one or more drives.

In another aspect of the present invention, a disk drive power cycle screening method for a RAID disk array includes: (1) selecting a drive in a RAID disk array for power cycle screening; (2) rerouting writes to the selected drive to a spare drive in the RAID disk array for storing; (3) rebuilding reads for the selected drive with data drives of a RAID level that the selected drive is in; (4) cycling power for the selected drive; (5) verifying that the selected drive functions properly; and (6) resynchronizing the selected drive by returning the writes from the spare drive to the selected drive.

In a further aspect of the present invention, an apparatus for implementing a disk drive power cycle screening method for a RAID disk array includes: (1) means for selecting a drive in a RAID disk array for power cycle screening; (2) means for rerouting writes to the selected drive to a spare drive in the RAID disk array for storing; (3) means for rebuilding reads for the selected drive with data drives of a RAID level that the selected drive is in; (4) means for cycling power for the selected drive; (5) means for verifying that the selected drive functions properly; and (6) means for resynchronizing the selected drive by returning the writes from the spare drive to the selected drive.

In still a further aspect of the present invention, a method for updating firmware on drives in a data storage system includes: (1) selecting one or more drives in a disk array for firmware update; (2) transferring data contained in the selected one or more drives to at least one receiving drive in the disk array via a non-disruptive data mover function; (3) updating firmware on the selected one or more drives; (4) verifying that the selected one or more drives function properly; and (5) returning the data from the at least one receiving drive to the selected one or more drives.

In still a further aspect of the present invention, a method for updating firmware on drives in a RAID disk array includes: (1) selecting a drive in a RAID disk array for firmware update; (2) rerouting writes to the selected drive to a spare drive in the RAID disk array for storing; (3) rebuilding reads for the selected drive with data drives of a RAID level that the selected drive is in; (4) updating firmware on the selected drive; (5) verifying that the selected drive functions properly; and (6) resynchronizing the selected drive by returning the writes from the spare drive to the selected drive.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and, together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention presents a disk drive power cycle screening method and apparatus for a data storage system such as a RAID storage system, or the like. The present method and apparatus may automatically verify that a drive in the data storage system survives a power failure. The present method may be performed when the data storage system is in normal operation (i.e., when the data storage system performs reads and/or writes for a host, which may be communicatively coupled to the data storage system wirelessly, via wire, via a network such as an intranet and the Internet, or the like). The present invention may prevent drive problems, which present themselves on a power cycle, from accumulating (which may result in all drive problems occurring at once when a power failure or a power up occurs).

Figure 1:
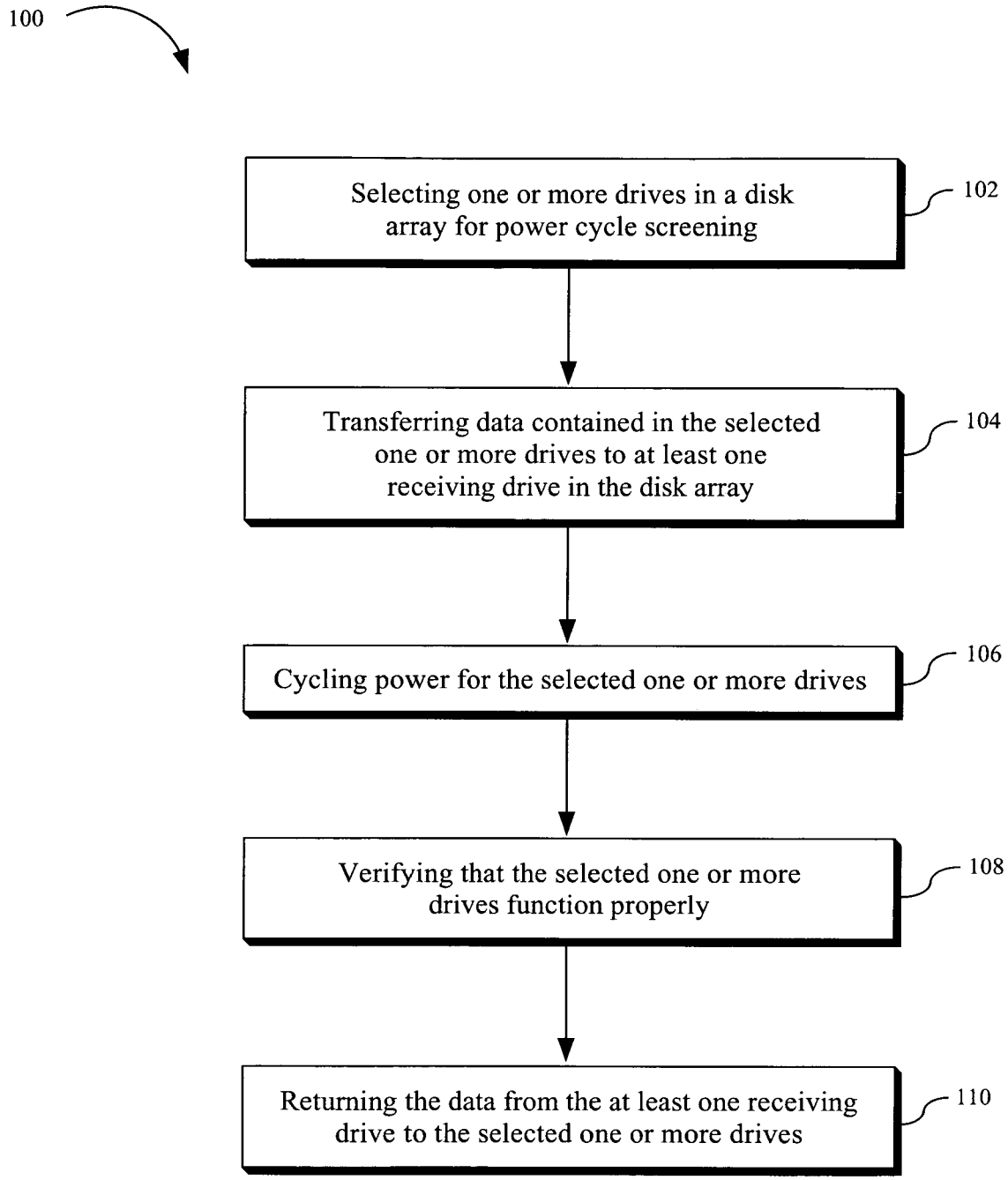
FIG. 1 is a flowchart of a disk drive power cycle screening method for a data storage system in an exemplary embodiment of the present invention.

Referring first to FIG. 1, a flowchart of a disk drive power cycle screening method 100 for a data storage system in an exemplary embodiment of the present invention is shown. The method 100 may start with a step 102 in which one or more drives in a disk array such as a RAID disk array, or the like are selected for power cycle screening. The disk array may be in normal operation (i.e., when the disk array performs reads and/or writes for a host, which may be communicatively coupled to the disk array wirelessly, via wire, via a network such as an intranet and the Internet, or the like). Data contained in the selected one or more drives may be transferred to at least one receiving drive in the disk array 104. Preferably, the data is transferred via a non-disruptive data mover function (i.e., other data, if any, contained in the receiving drive is kept intact). Power for the selected one or more drives is cycled (i.e., powered down and powered up) 106. The selected one or more drives may be verified to ensure that the selected one or more drives function properly 108. The data is returned from the receiving drive to the selected one or more drives 110. Preferably, the data is returned from the receiving drive to the selected one or more drives via a non-disruptive data mover function (i.e., other data, if any, contained in the selected one or more drives is kept intact). Then, a next drive or next drives in the disk array may be selected for power cycle screening to repeat the method 100.

Figure 2:
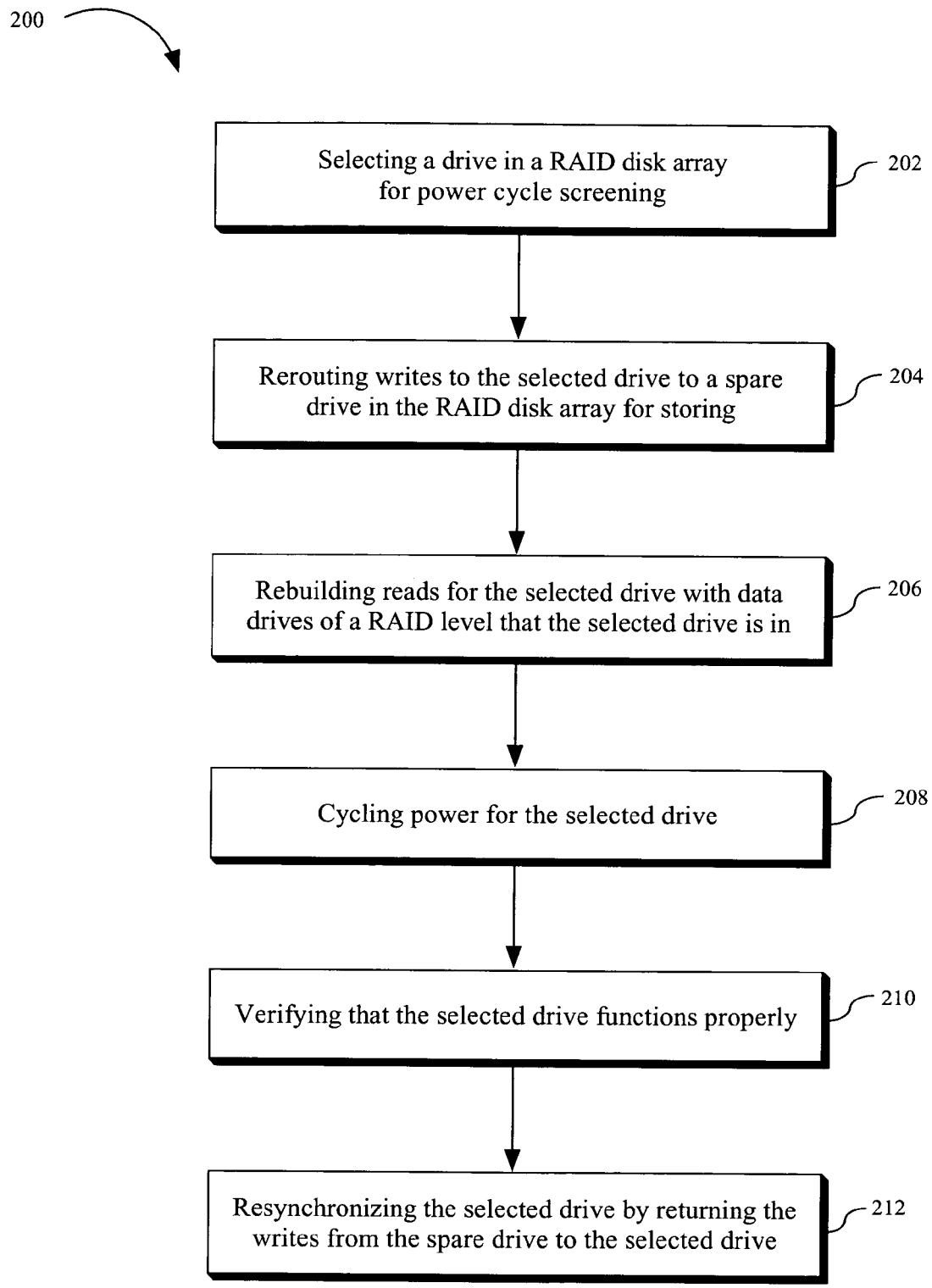
FIG. 2 is a flowchart of a disk drive power cycle screening method for a RAID disk array in an exemplary embodiment of the present invention.

FIG. 2 is a flowchart of a disk drive power cycle screening method 200 for a RAID disk array in an exemplary embodiment of the present invention. The method 200 may start with a step 202 in which a drive in a RAID disk array is selected for power cycle screening. The RAID disk array may have a level of RAID 0, RAID 1, RAID 2, RAID 3, RAID 4, RAID 5, or RAID 6, or a combination of levels such as RAID 10, RAID 0+1, or the like. The RAID disk array may be in normal operation (i.e., when the RAID disk array performs reads and/or writes for a host, which may be communicatively coupled to the RAID disk array wirelessly, via wire, via a network such as an intranet and the Internet, or the like). Writes to the selected drive may be rerouted to a spare drive in the RAID disk array for storing 204. Reads for the selected drive may be rebuilt with data drives of a RAID level (preferably RAID 0, RAID 1, RAID 3, RAID 5, or RAID 6) that the selected drive is in 206. Power for the selected drive is cycled 208. The selected drive may be verified to ensure that the selected drive functions properly 210. The selected drive is resynchronized by returning the writes from the spare drive to the selected drive 212. Preferably, the writes are returned from the spare drive to the selected drive via a non-disruptive data mover function (i.e., other data, if any, contained in the selected drive is kept intact). Then, a next drive in the RAID disk array may be selected for power cycle screening to repeat the method 200.

Figure 3:
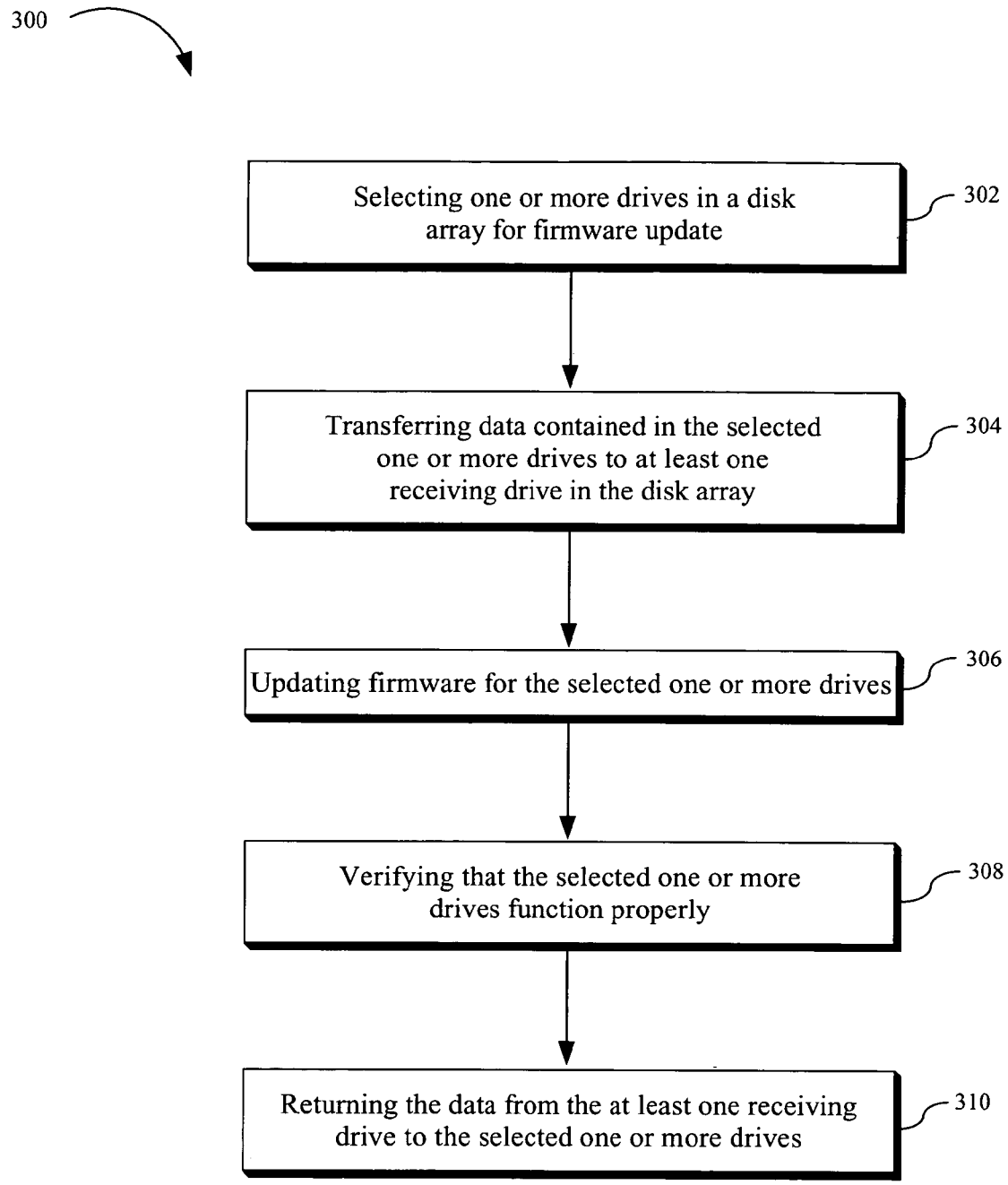
FIG. 3 is a flowchart of a method for updating firmware on drives in a data storage system in an exemplary embodiment of the present invention.

The present invention may also be used to allow firmware updates to drives in a data storage system. Referring now to FIG. 3, a flowchart of a method 300 for updating firmware on drives in a data storage system in an exemplary embodiment of the present invention is shown. The method 300 may start with a step 302 in which one or more drives in a disk array such as a RAID disk array, or the like is selected for firmware update. The disk array may be in normal operation (i.e., when the disk array performs reads and/or writes for a host, which may be communicatively coupled to the disk array wirelessly, via wire, via a network such as an intranet and the Internet, or the like). Data contained in the selected one or more drives may be transferred to at least one receiving drive in the disk array 304. Preferably, the data is transferred via a non-disruptive data mover function (i.e., other data, if any, contained in the receiving drive is kept intact). Firmware on the selected one or more drives is updated 306. The selected one or more drives are verified for proper functionality 308. The data is returned from the receiving drive to the selected one or more drives 310. Preferably, the data is returned from the receiving drive to the selected one or more drives via a non-disruptive data mover function (i.e., other data, if any, contained in the selected one or more drives is kept intact). Then, a next drive or next drives in the disk array may be selected for firmware update to repeat the method 300.

Figure 4:
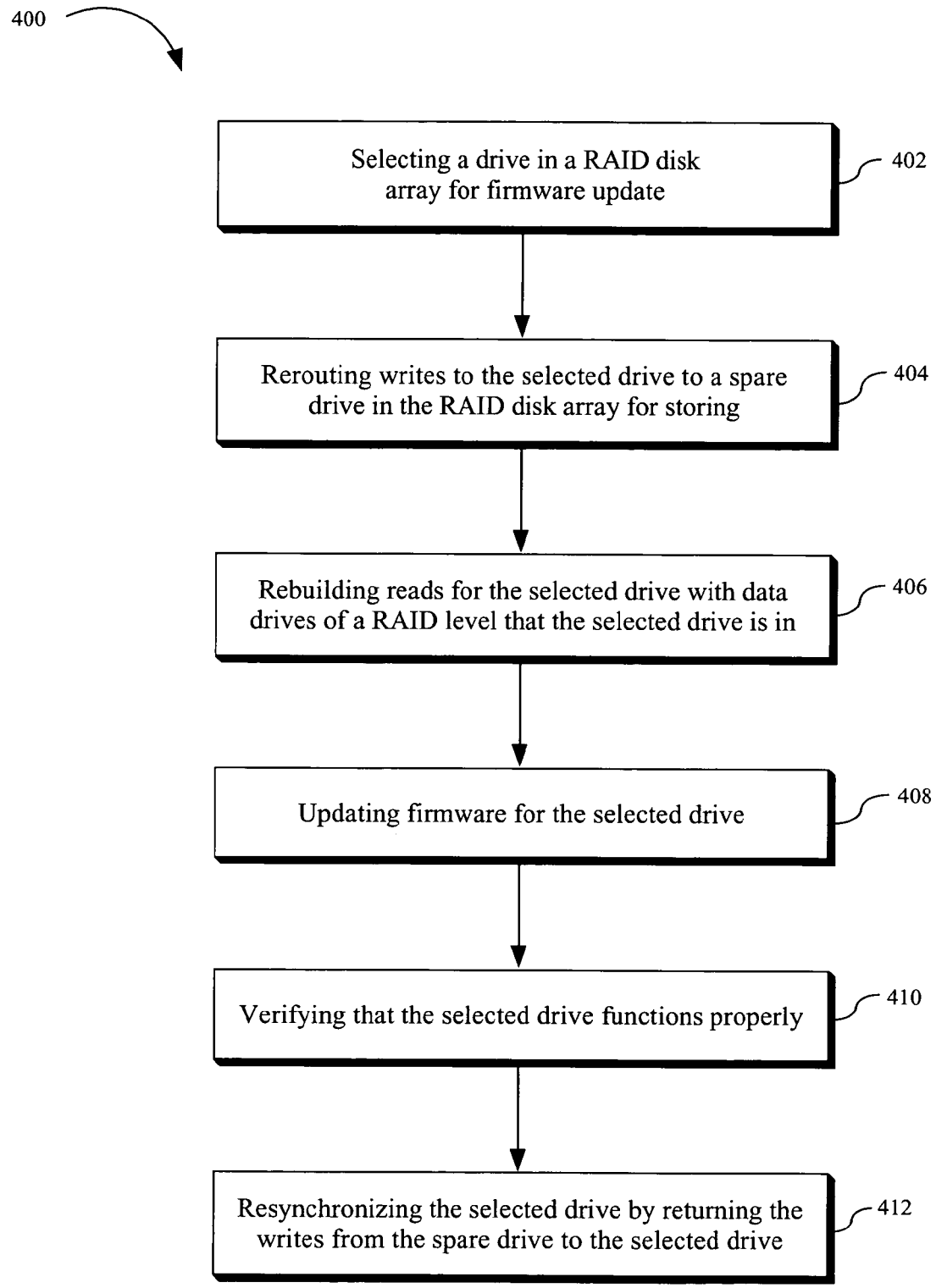
FIG. 4 is a flowchart of a method for updating firmware on drives in a RAID disk array in an exemplary embodiment of the present invention.

FIG. 4 is a flowchart of a disk drive power cycle screening method 400 for a RAID disk array in an exemplary embodiment of the present invention. The method 400 may start with a step 402 in which a drive in a RAID disk array is selected for firmware update. The RAID disk array may have a level of RAID 0, RAID 1, RAID 2, RAID 3, RAID 4, RAID 5, or RAID 6, or a combination of levels such as RAID 10, RAID 0+1, or the like. The RAID disk array may be in normal operation (i.e., when the RAID disk array performs reads and/or writes for a host, which may be communicatively coupled to the RAID disk array wirelessly, via wire, via a network such as an intranet and the Internet, or the like). Writes to the selected drive may be rerouted to a spare drive in the RAID disk array for storing 404. Reads for the selected drive may be rebuilt with data drives of a RAID level (preferably RAID 0, RAID 1, RAID 3, RAID 5, or RAID 6) that the selected drive is in 406. Firmware on the selected drive is updated 408. The selected drive is verified for proper functionality 410. The selected drive is resynchronized by returning the writes from the spare drive to the selected drive 412. Preferably, the writes are returned from the spare drive to the selected drive via a non-disruptive data mover function (i.e., other data, if any, contained in the selected drive is kept intact). Then, a next drive in the RAID disk array may be selected for firmware update to repeat the method 200.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A disk drive power cycle screening method for a data storage system, comprising:
    selecting one or more normally operating disks in a disk array for power cycle screening;
    transferring data contained in said selected one or more drives to at least one receiving drive in said disk array;
    cycling power for said selected one or more drives;
    verifying that said selected one or more drives function properly; and
    returning said data from said at least one receiving drive to said selected one or more drives.

2. The disk drive power cycle screening method of claim 1, wherein said transferring data is implemented via a non-disruptive data mover function.

3. The disk drive power cycle screening method of claim 1, wherein said disk array is a RAID disk array.

4. The disk drive power cycle screening method of claim 1, wherein said returning said data is implemented via a non-disruptive data mover function.

5. The disk drive power cycle screening method of claim 1, further comprising selecting next one or more drives in said disk array for power cycle screening.

6. An apparatus for implementing a disk drive power cycle screening method for a data storage system, comprising:
    means for selecting one or more normally operating disks in a disk array for power cycle screening;
    means for transferring data contained in said selected one or more drives to at least one receiving drive in said disk array;
    means for cycling power for said selected one or more drives;
    means for verifying that said selected one or more drives function properly; and
    means for returning said data from said at least one receiving drive to said selected one or more drives.

7. The apparatus of claim 6, wherein said data is transferred from said selected one or more drives to said at least one receiving drive via a non-disruptive data mover function.

8. The apparatus of claim 6, wherein said disk array is a RAID disk array.

9. The apparatus of claim 6, wherein said data is returned from said at least one receiving drive to said selected one or more drives via a non-disruptive data mover function.

10. The apparatus of claim 6, further comprising means for selecting next one or more drives in said disk array for power cycle screening.

11. A disk drive power cycle screening method for a RAID disk array, comprising:
    selecting a normally operating disk in a RAID disk array for power cycle screening;

rerouting writes to said selected drive to a spare drive in said RAID disk array for storing;
rebuilding reads for said selected drive with data drives of a RAID level that said selected drive is in;
cycling power for said selected drive;
verifying that said selected drive functions properly; and
resynchronizing said selected drive by returning said writes from said spare drive to said selected drive.

12. The disk drive power cycle screening method of claim 11, wherein said RAID level is selected from a group consisting of RAID 0, RAID 1, RAID 3, RAID 5 and RAID 6.

13. The disk drive power cycle screening method of claim 11, wherein said writes are returned from said spare drive to said selected drive via a non-disruptive data mover function.

14. The disk drive power cycle screening method of claim 11, further comprising selecting a next drive in said RAID disk array for power cycle screening.

15. An apparatus for implementing a disk drive power cycle screening method for a RAID disk array, comprising:
means for selecting a normally operating disk in a RAID disk array for power cycle screening;
means for rerouting writes to said selected drive to a spare drive in said RAID disk array for storing;
means for rebuilding reads for said selected drive with data drives of a RAID level that said selected drive is in;
means for cycling power for said selected drive;
means for verifying that said selected drive functions properly; and
means for resynchronizing said selected drive by returning said writes from said spare drive to said selected drive.

16. The apparatus of claim 15, wherein said RAID level is selected from a group consisting of RAID 0, RAID 1, RAID 3, RAID 5 and RAID 6.

17. The apparatus of claim 15, wherein said writes are returned from said spare drive to said selected drive via a non-disruptive data mover function.

18. The apparatus of claim 15, further comprising means for selecting a next drive in said RAID disk array for power cycle screening.

* * * * *